United States Patent Office 3,124,604
Patented Mar. 10, 1964

3,124,604
NEW ORGANIC ZINC COMPOUNDS AND A PROCESS FOR THE PRODUCTION OF THESE ORGANIC ZINC COMPOUNDS TOGETHER WITH ORGANIC ALUMINIUM MONOHALIDES
Edmund Hüther, Mulheim an der Ruhr, Germany, assignor to Karl Ziegler, Mulheim an der Ruhr, Germany
No Drawing. Filed Feb. 20, 1957, Ser. No. 641,269
Claims priority, application Germany Feb. 21, 1956
12 Claims. (Cl. 260—429.9)

This invention relates to new organic zinc compounds and a process for the production of these organic zinc compounds together with organic aluminium monohalides.

It is known that alkyl mercury halides and alkyl cadmium halides such as RHgCl and RCdCl can be produced by the action of organic aluminium compounds on mercuric or cadmium dihalides (cf. U.S. patent specification No. 2,473,434). All the known types of organic aluminium compounds, namely $R_3Al$, $R_2Al$-halogen and $RAl$ (halogen)$_2$ can be used in the same way for this purpose. When suitable proportions are used the reactions proceed regularly, so that an aluminium halide together with a mixed alkyl metal halide is formed, for example

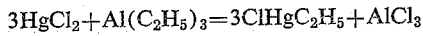

or

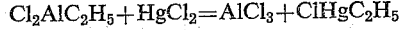

Moreover, with an excess of the organic aluminium component, only one of the halogen atoms on the metal is replaced by an alkyl radical in these reactions (U.S. patent specification No. 2,473,434, column 3, line 44 et seq.

The surprising observation has now been made that the reaction between zinc dihalides and organic aluminium compounds of the general formula $AlR_3$, wherein R is a saturated or unsaturated aliphatic, aromatic, hydro-aromatic or araliphatic radical, preferably an aluminium trialkyl, is subject to entirely different rules. For example zinc chloride reacts with compounds of the $R_2Al$-halogen and $RAl$ (halogen)$_2$ type, but there is no exchange of a chlorine atom for an alkyl radical. On the other hand, with the aid of an aluminium trialkyl, both chlorine atoms of the zinc chloride can be replaced by alkyl radicals without any difficulty, but only one of the three alkyl radicals on a given molecule of the aluminium trialkyl is transferred to the zinc atom, i.e. the reaction proceeds as a whole in accordance with the following equation:

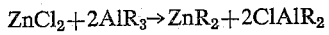

Accordingly, the present invention provides new organic zinc compounds of the general formula $ZnR_2$, in which R is a saturated or unsaturated aliphatic, aromatic, hydro-aromatic or araliphatic radical.

The invention also provides a process for the production of these organic zinc compounds together with organic aluminium mono-halides of the general formula $R_2AlX$, in which R has the significance indicated above and X is a halogen atom, which comprises reacting a zinc dihalide with an organic aluminium compound of the general formula $AlR_3$, in which R has the significance indicated above, in a molar ratio of approximately 1:2.

For convenience the radical R will be referred to hereafter in this description as an alkyl radical.

The zinc dialkyls and the dialkyl aluminium monohalides which are formed together in this reaction are distillable liquids with boiling points so far apart that the substances can readily be separated from one another by a simple distillation process, preferably vacuum distillation.

For separating the two reaction products which are formed together, it is also possible to make use of the fact that the dialkyl aluminium monohalides, especially the chlorides, form very stable complex compounds of the general formula $K[AlR_2Cl_2]$ with potassium chloride. These substances cannot be distilled. Moreover, many of them are sparingly soluble in certain organic solvents, such as pentane or petroleum ether, so that the separation of the zinc alkyls from the aluminium compounds also formed does not present any difficulty even when separation by distillation is less advisable because the boiling points are high and there is consequently a danger of decomposition.

The process of the invention allows zinc dialkyls to be produced very simply, even on a relatively large scale, since the aluminium alkyls can be very easily obtained directly from aluminium, hydrogen and olefines. The dialkyl monohalides, and especially the chlorides, which are formed together with the zinc dialkyls in the process of the invention are by no means waste products in which two-thirds of the alkyl radicals originally present are lost, but these substances can equally well be considered as high-grade main products of the process of the invention, since they are of value in the production of dialkyl aluminium chlorides.

Dialkyl aluminium chlorides are important components of the organo-metallic mixed catalysts used for the production of low-pressure polyethylene. The diethyl aluminium chloride, for example, needed for the synthesis of polyethylene has hitherto been produced by the action of ethyl chloride on aluminium, whereas now this aluminium compound can be obtained from aluminium triethyl by the reaction thereof with zinc chloride. Assuming a catalyst consumption of approximately 1% in the synthesis of 12,000 tons per year of low-pressure polyethylene, production of the catalyst by the process of the invention would allow the concurrent production of approximately 60 tons of zinc diethyl.

The process of the invention can be carried out in various ways. Generally speaking, use will be made of the cheap zinc chloride, but it is of course also possible to use other zinc halides. It is an especial advantage of the process of the invention that it is not necessary for the zinc chloride or other zinc halide to be used in a particularly finely divided form, although such a procedure would be possible and in any case has no harmful effect. Furthermore, zinc chloride reacts readily with the aluminium trialkyls even when it is in lump form without the heat of reaction being particularly high, so that it is readily possible to work without solvents when concentrated aluminium alkyls are used, although solvents can be used if desired.

Zinc chloride is a very hygroscopic substance and it must be carefully dehydrated before being reacted with the aluminium trialkyl. It is possible for this dehydration to be carried out in known manner, for example by melting, preferably while passing dry hydrogen chloride therethrough. The melting point of the anhydrous zinc chloride is 318° C. It is very desirable to carry out the dehydration of the zinc chloride in the vessel in which subsequently the reaction with the aluminium trialkyl is to be carried out. After the melting operation, the zinc chloride is then simply left to cool and solidify in the vessel, this being an extremely simple method of avoiding the reabsorption of water, and then the aluminium trialkyl is added. The zinc chloride quickly liquifies and dissolves, especially when the aluminium trialkyl layer is stirred, and the reaction is complete when the last trace of solid zinc chloride has disappeared.

The reaction has a very wide range of uses, since it allows the production of compounds of the general formula ZnR$_2$ in which R is a saturated or unsaturated aliphatic, aromatic, hydro-aromatic or araliphatic radical. It should be mentioned that the production of zinc diaryls is not of great practical importance at the present time, since there is at present no method of manufacturing aluminium triaryls which is as simple as that known for aluminium trialkyls.

Usually, the organic aluminium compounds contain small proportions of impurities, especially by-products formed during manufacture.

However, the smooth progress of the process of the invention is subject to one condition: the aluminium trialkyls used should be free from dialkyl aluminium hydrides. In the presence of such hydrogen compounds, metallic zinc is normally formed, whereby the reaction products are given a dark colour, the yields are lowered and the working up process is made difficult. If these disadvantages are accepted, it is of course also possible to work with aluminium alkyls which contain such hydrides, but it is obvious that the hydride content must not be too high.

The following examples further illustrate the invention.

*Example 1*

67.5 g. of zinc chloride are melted in a stream of dry hydrogen chloride in a dry round-bottomed flask fitted with a side tube. After the hydrogen chloride has been passed through for 1 hour, the residual hydrogen chloride is displaced by nitrogen. The zinc chloride is now anhydrous. The zinc chloride is allowed to cool, and 114 g. of aluminium triethyl are added in a nitrogen atmosphere. The zinc chloride dissolves within 15 minutes with slight spontaneous heating. The components of the reaction mixture are separated by distillation using a small column and a pressure of 10 mm. 56 g. of pure zinc diethyl (=94%) are distilled over at a temperature between 26 and 28° C. The residue distils at a temperature between 90 and 92° C. with a pressure of 10 mm., this residue being pure aluminium diethyl chloride.

*Example 2*

In a dry reaction flask with a side tube, 160 g. of zinc iodide are melted for dehydration purposes with 5 g. of zinc shavings at a pressure of 10 mm. After cooling, the flask is filled with nitrogen and 72 g. of aluminium trimethyl are added. The zinc iodide has dissolved after half an hour with slight spontaneous heating. The reaction mixture is separated by distillation through a column containing filler bodies. 45 g. (=95%) of pure zinc dimethyl distil over at 46° C. The residue boils at 109–112° C. at a pressure of 50 mm., and this residue is pure aluminium dimethyl iodide.

*Example 3*

67.5 g. of zinc chloride are dehydrated as in Example 1. After cooling, 198 g. of aluminium triisobutyl are added. The zinc chloride dissolves with slight spontaneous heating in 1–1½ hours. For separating the components of the reaction mixture, the reaction mixture is distilled using a small column filled with filler bodies. 75. g. of pure zinc diisobutyl (=95%) distil over at 50.5 to 51° C. and 10 mm. pressure. The residue boils at a temperature between 124 and 125° C. at 3 mm. pressure, and this is pure aluminium diisobutyl chloride.

*Example 4*

67.5 g. of zinc chloride are dehydrated as in Example 1 and mixed after cooling with 324 g. of aluminium tri-n-heptyl.

After heating for 3 hours at 100° C. the zinc chloride has dissolved. The reaction mixture is distilled at a pressure of 10$^{-4}$ mm. 117 g. (=90%) of zinc di-n-heptyl distil over at a temperature between 121 and 123° C. The residue is aluminium di-n-heptyl chloride.

*Example 5*

67.5 g. of zinc chloride are dehydrated as in Example 1 and 156 g. of aluminium tri-n-propyl are added after the zinc chloride has cooled. The zinc chloride dissolves within half an hour. The reaction mixture is stirred for 2 hours at 120° C. with 75 g. of dry potassium chloride. The reaction product solidifies on cooling. It is triturated under argon and washed three times with 200 cc. of pentane on each occasion. The zinc tri-n-propyl which is formed passes over the pentane. After the pentane has been distilled off, pure zinc di-n-propyl is left, which boils at 154° C. under normal pressure. The yield is 68 g. (=91%). That portion of the reaction mixture which is insoluble in pentane is K[Al(C$_3$H$_7$)$_2$Cl$_2$].

*Example 6*

67.5 g. of zinc chloride are dehydrated as in Examples 1 to 5. After cooling, 351 g. of aluminium tri-[β-(cyclohexene-(3)-yl-ethyl)]

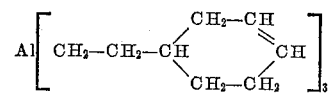

are added in a nitrogen atmosphere and the mixture formed is heated for 5 hours at 120° C. After this time, the zinc chloride has dissolved. For separating components of the reaction mixture, the reaction mixture is distilled under high vacuum. The zinc di-[β-(cyclohexane-(3)-yl-ethyl)] distils over at a temperature between 130 and 145° C. at a pressure of 10$^{-2}$ mm. For purification purposes, the compound is again distilled under high vacuum. The boiling point is 144–145° C. at a pressure of 6.10$^{-2}$ mm. The yield is 135 g. (88%). The residue which is left is aluminium di-[β-(cyclohexane-(3)-yl-ethyl)] chloride, which cannot be distilled. When high vacuum distillation is used, care must be taken that the temperature of the heating bath is only a few degrees higher than the boiling point of the zinc compound, since the aluminium dialkyl chloride partially decomposes at a higher temperature.

The aluminium tri-[β-(cyclo-hexane-(3)-yl-ethyl)] is produced by boiling aluminium triisobutyl under reflux with twice the theoretical amount of vinyl cyclo-hexene (the dimer of butadiene) until the correct amount of isobutene has escaped. The boiling point is adjusted to 115–120° C. by adding benzene. Finally, any remaining volatile constituent is distilled off in vacuo (10 mm.) with a bath temperature of 100° C. The residue is the desired aluminium tri-[β-(cyclo-hexane-(3)-yl-ethyl)].

*Example 7*

67.5 g. of zinc chloride are dehydrated as in Examples 1 to 6. After cooling, the zinc chloride has 384 g. of aluminium tri-(2-phenyl-propyl-(1))

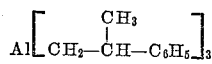

added thereto under nitrogen. After the mixture has been heated for 5 hours at 120° C., the zinc chloride has dissolved. The separation of the constituents of the reaction mixture is effected by high vacuum distillation. The zinc di-(2-phenyl-propyl-(1)) distils off at a temperature of 129–131° C. at a pressure of 10$^{-2}$ mm. For purification purposes, it is distilled at 10$^{-4}$ mm. The boiling point is 115–116° C., and the yield is 136 g. (90%). The distillation residue is aluminium di-(2-phenyl-propyl-(1)) chloride. During distillation, care must be taken that the temperature of the heating bath is only slightly above the boiling point of the zinc compound, since the residual aluminium compound partially decomposes at a higher temperature.

What I claim is:

1. Process for the production of organic compounds of zinc and of aluminium which comprises reacting a zinc dihalide having the general formula ZnX$_2$ in which X represents a halogen atom which is a member selected from the group consisting of chlorine and iodine atoms with an organic aluminium compound having the general formula $AlR_3$ in which R represents a hydrocarbon radical, in a molar ratio of about 1:2 to thereby form an organic zinc compound of the general formula $ZnR_2$ and an organic aluminium monohalide of the general formula $R_2AlX$, thereafter separating said organic zinc compound from said organic aluminium monohalide and recovering at least one of said separated compounds.

2. Process according to claim 1 in which said zinc dihalide is dehydrated zinc chloride.

3. Process according to claim 1 in which said organic aluminium compound is substantially free from organic aluminium hydrides.

4. Process according to claim 1 in which said organic aluminium compound is an aluminium trialkyl substantially free from organic aluminium hydrides.

5. Process according to claim 4 in which said organic aluminium compound is aluminium triethyl and in which said zinc dihalide is zinc chloride.

6. Process according to claim 1 in which said organic zinc compound is separated from said organic aluminum monohalide by distillation.

7. Process according to claim 6 in which said distillation is effected under vacuum.

8. Process for the production of organic compounds, which comprises reacting a zinc dihalide having the general formula $ZnX_2$ in which X represents a halogen atom which is a member selected from the group consisting of chlorine and iodine atoms with an organic aluminium compound having the general formula $AlR_3$ in which R represents a hydrocarbon radical, in a molar ratio of about 1:2, to thereby form an organic zinc compound of the general formula $ZnR_2$ and an organic aluminium monohalide of the general formula $R_2AlX$, contacting the reaction mixture with potassium chloride to thereby form a complex with the aluminium monohalide of the formula $K(AlR_2ClX)$ and thereafter separating said organic zinc compound from said complex by distillation.

9. Process according to claim 8 in which said zinc dihalide is zinc chloride.

10. Process for the production of organic compounds, which comprises reacting a zinc dihalide having the general formula $ZnX_2$ in which X represents a halogen atom which is a member selected from the group consisting of chlorine and iodine atoms with an organic aluminium compound having the general formula $AlR_3$ in which R represents a hydrocarbon radical, in a molar ratio of about 1:2, to thereby form an organic zinc compound of the general formula $ZnR_2$ and an organic aluminium monohalide of the general formula $R_2AlX$, contacting the reaction mixture with potassium chloride to thereby form a complex with the aluminium monohalide of the formula $K(AlR_2ClX)$, and thereafter separating said organic zinc compound from said complex by solvent extraction with an organic solvent.

11. Process according to claim 10 in which said zinc halide is zinc chloride.

12. Process according to claim 10 in which said extraction is effected with a solvent selected from the group consisting of pentane and petroleum ether.

References Cited in the file of this patent

UNITED STATES PATENTS

| | | |
|---|---|---|
| 1,938,180 | Groll | Dec. 5, 1933 |
| 2,473,434 | Lindsey et al. | June 14, 1949 |
| 2,739,165 | Pleuddemann | Mar. 20, 1956 |

FOREIGN PATENTS

| | | |
|---|---|---|
| 931,107 | Germany | Aug. 1, 1955 |
| 934,649 | Germany | Nov. 3, 1955 |
| 1,120,344 | France | Apr. 16, 1956 |
| 540,135 | Belgium | Jan. 27, 1956 |
| 535,418 | Italy | Nov. 14, 1955 |
| 768,765 | Great Britain | Feb. 20, 1957 |

OTHER REFERENCES

Hatch et al.: "J. of Organic Chemistry," 14, 1130–6 (1949).

Article by Schultz, "Organoaluminum Compounds," in Advances in Chemistry, Series No. 23, entitled "Metal-Organic Compounds," pp. 166 and 170 relied on. Published by the American Chemical Society, 1959.